United States Patent
Tamaki

(10) Patent No.: US 9,958,741 B2
(45) Date of Patent: May 1, 2018

(54) LIQUID CRYSTAL DISPLAY DEVICE

(71) Applicant: Japan Display Inc., Minato-ku (JP)

(72) Inventor: Masaya Tamaki, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 120 days.

(21) Appl. No.: 14/690,772

(22) Filed: Apr. 20, 2015

(65) Prior Publication Data

US 2015/0301387 A1  Oct. 22, 2015

(30) Foreign Application Priority Data

Apr. 21, 2014 (JP) ................................. 2014-087682

(51) Int. Cl.
G02F 1/1335 (2006.01)
G02F 1/1343 (2006.01)
G02F 1/1368 (2006.01)

(52) U.S. Cl.
CPC ........ *G02F 1/13439* (2013.01); *G02F 1/1368* (2013.01); *G02F 1/133504* (2013.01); *G02F 1/133555* (2013.01); *G02F 1/134309* (2013.01); *G02F 2001/134345* (2013.01)

(58) Field of Classification Search
CPC .............. G02F 1/133555; G02F 2001/134345
See application file for complete search history.

(56) References Cited

U.S. PATENT DOCUMENTS

| 7,791,692 B2* | 9/2010 | Choi ................. G02F 1/133555 349/109 |
| 2008/0143911 A1* | 6/2008 | Jin ......................... G02F 1/1323 349/48 |
| 2014/0022499 A1 | 1/2014 | Tamaki et al. |
| 2015/0248039 A1 | 9/2015 | Tamaki |

FOREIGN PATENT DOCUMENTS

| JP | 2004-302294 | 10/2004 |
| JP | 2014-021277 | 2/2014 |

* cited by examiner

*Primary Examiner* — Kendrick Hsu
(74) *Attorney, Agent, or Firm* — Oblon, McClelland, Maier & Neustadt, L.L.P.

(57) ABSTRACT

According to one embodiment, a liquid crystal display device includes a first substrate unit, a second substrate unit, and a liquid crystal layer. The first substrate unit includes a first pixel electrode and a second pixel electrode. The second pixel electrode is adjacent to the first pixel electrode in the first direction. The second pixel electrode is light-reflective. The second substrate unit includes a counter electrode. The counter electrode is light-transmissive. The liquid crystal layer is provided between the first substrate unit and the second substrate unit. The first pixel electrode includes a first electrode portion and a second electrode portion. The first electrode portion is light-reflective. At least a portion of the second electrode portion is provided between the first electrode portion and the second pixel electrode. A light reflectance of the second electrode portion is lower than a light reflectance of the first electrode portion.

12 Claims, 7 Drawing Sheets

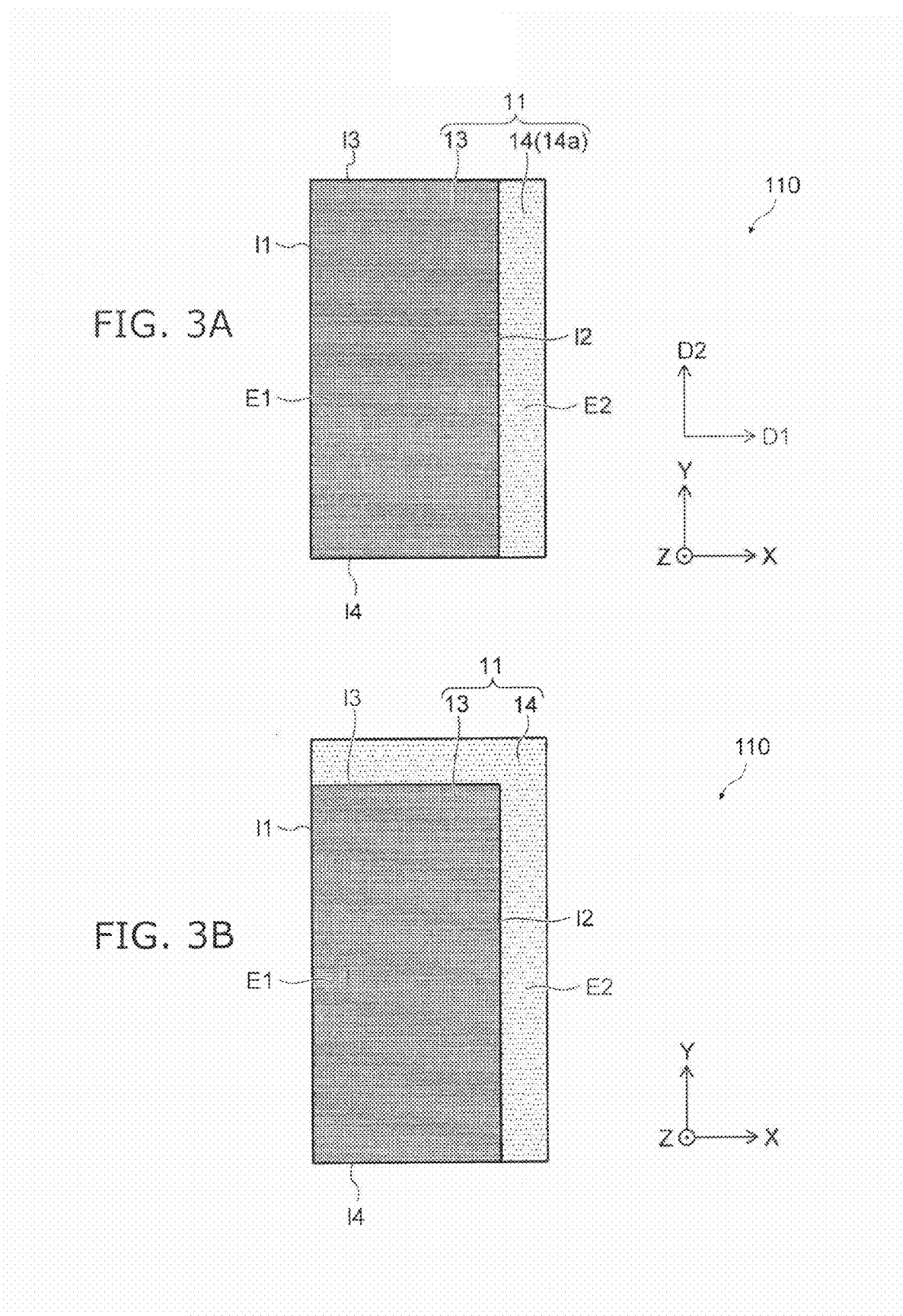

LIQUID CRYSTAL DISPLAY DEVICE

CROSS-REFERENCE TO RELATED APPLICATIONS

This application is based upon and claims the benefit of priority from Japanese Patent Application No. 2014-087682, filed on Apr. 21, 2014; the entire contents of which are incorporated herein by reference.

FIELD

Embodiments described herein relate generally to a liquid crystal display device.

BACKGROUND

Liquid crystal display devices are used in various applications. The power consumption can be small in a reflection-type display device that displays using external light. Improved ease of viewing is desirable for the reflection-type liquid crystal display device.

BRIEF DESCRIPTION OF THE DRAWINGS

FIG. 3A and FIG. 3B are schematic plan views showing the liquid crystal display device according to the first embodiment;

DETAILED DESCRIPTION

Figure 1:
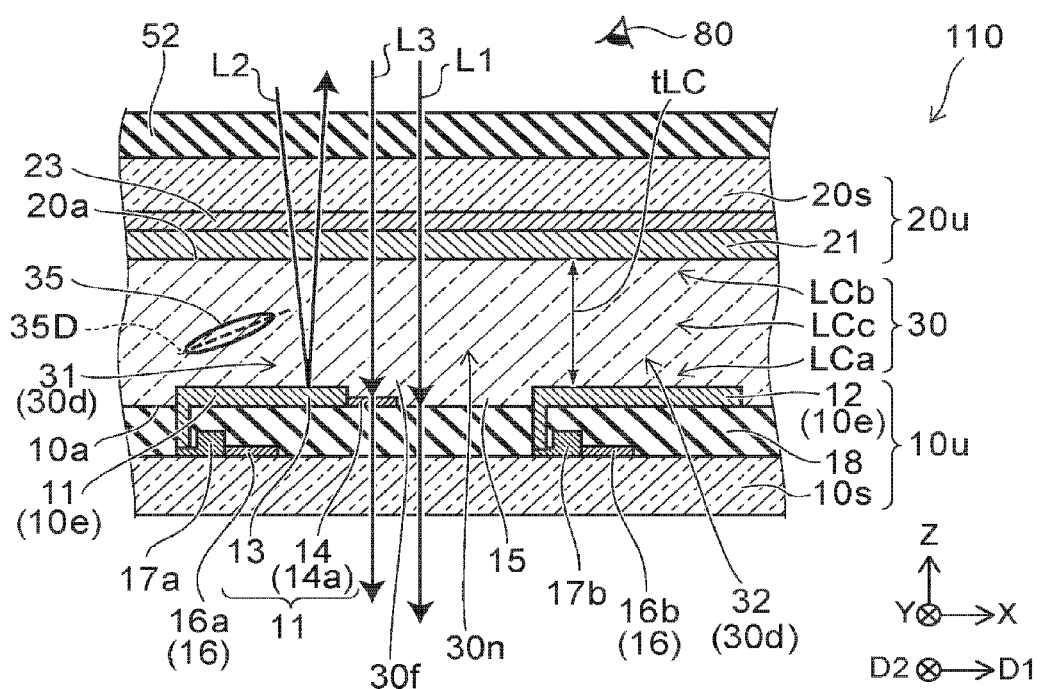
FIG. 1 is a schematic cross-sectional view showing a liquid crystal display device according to a first embodiment.

According to one embodiment, a liquid crystal display device includes a first substrate unit, a second substrate unit, and a liquid crystal layer. The first substrate unit has a first major surface. The first substrate unit includes a first pixel electrode and a second pixel electrode. The first pixel electrode is disposed in the first major surface. The second pixel electrode is disposed in the first major surface and is arranged with the first pixel electrode to be adjacent to the first pixel electrode in the first direction. The second pixel electrode is light-reflective. The second substrate unit has a second major surface opposing the first major surface. The second substrate unit includes a counter electrode provided in the second major surface. The counter electrode is light-transmissive. The liquid crystal layer is provided between the first major surface and the second major surface. The first pixel electrode includes a first electrode portion and a second electrode portion. The first electrode portion is light-reflective. At least a portion of the second electrode portion is provided between the first electrode portion and the second pixel electrode. A light reflectance of the second electrode portion is lower than a light reflectance of the first electrode portion.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1 is a schematic cross-sectional view showing a liquid crystal display device according to a first embodiment.

As shown in FIG. 1, the liquid crystal display device 110 according to the embodiment includes a first substrate unit 10u, a second substrate unit 20u, and a liquid crystal layer 30.

A direction from the first substrate unit 10u toward the second substrate unit 20u is taken as a Z-axis direction. One direction perpendicular to the Z-axis direction is taken as an X-axis direction. A direction perpendicular to the Z-axis direction and the X-axis direction is taken as a Y-axis direction.

As long as the X-axis and the Y-axis intersect, the angle between the X-axis and the Y-axis may be 90 degrees or less.

The first substrate unit 10u and the second substrate unit 20u extend along the X-Y plane.

The first substrate unit 10u has a first major surface 10a. The first major surface 10a intersects the Z-axis direction. In the example, the first major surface 10a is parallel to the X-Y plane. The first substrate unit 10u includes multiple pixel electrodes 10e (a first pixel electrode 11, a second pixel electrode 12, etc., described below). The multiple pixel electrodes 10e are disposed inside the first major surface 10a. The multiple pixel electrodes 10e are mainly light-reflective.

The second pixel electrode 12 is arranged with the first pixel electrode 11 in a first direction D1. The first direction D1 is parallel to the X-axis direction. The second pixel electrode 12 is light-reflective. The first pixel electrode 11 includes a first electrode portion 13 and a second electrode portion 14. At least a portion of the second electrode portion 14 is provided between the first electrode portion 13 and the second pixel electrode 12. The first electrode portion 13 is light-reflective. The light reflectance of the second electrode portion 14 is lower than the light reflectance of the first electrode portion 13. In the example, the second electrode portion 14 is light-transmissive. The embodiment also includes the case where the second electrode portion 14 is light-absorbing.

The first substrate unit 10u includes an inter-pixel region 15. The inter-pixel region 15 is the region between the first pixel electrode 11 and the second pixel electrode 12. The inter-pixel region 15 is the region between the multiple pixel electrodes 10e.

The second substrate unit 20u has a second major surface 20a. The second major surface 20a opposes the first major surface 10a. The second substrate unit 20u includes a counter electrode 21 (a common electrode). The counter electrode 21 is provided in the second major surface 20a (disposed inside the second major surface 20a). The counter electrode 21 is light-transmissive.

In the example, the second substrate unit 20u further includes a second substrate 20s. The second substrate 20s is light-transmissive. The counter electrode 21 is disposed between the second substrate 20s and the liquid crystal layer 30.

A color filter 23 is provided between the second substrate 20s and the counter electrode 21. A polarizing layer 52 (a second polarizing layer 52 described below) is provided on the second substrate 20s.

On the other hand, the first substrate unit 10u further includes a first substrate 10s, interconnects 16 (a first interconnect 16a, a second interconnect 16b, etc.), a first switching element 17a, a second switching element 17b, and an insulating layer 18.

The multiple pixel electrodes 10e are provided on the first substrate 10s. The first substrate 10s is light-transmissive.

The first switching element 17a is electrically connected to the first pixel electrode 11. The first interconnect 16a is electrically connected to the first switching element 17a. The first interconnect 16a is a signal line. The signal line supplies charge to the first pixel electrode 11. The supply of the charge is performed via the first switching element 17a. The first interconnect 16a may be a scanning line (a gate line). A signal that controls the operation of the first switching element 17a is input to the scanning line.

The second switching element 17b (a transistor, a non-linear resistance element, etc.) is electrically connected to the second pixel electrode 12. The second interconnect 16b is electrically connected to the second switching element 17b. The second interconnect 16b is a signal line or a scanning line (a gate line).

The insulating layer 18 is provided between the first interconnect 16a and the first pixel electrode 11. The insulating layer 18 is further provided between the second interconnect 16b and the second pixel electrode 12.

The first interconnect 16a is positioned between the first pixel electrode 11 and the first substrate 10s. The second interconnect 16b is positioned between the second pixel electrode 12 and the first substrate 10s.

In the first substrate unit 10u, the interconnects 16 (and the switching elements) are covered with the insulating layer 18. The pixel electrodes 10e are provided on the insulating layer 18.

In the embodiment, light (a first light L1, a second light L2, a third light L3, etc.) includes visible light. The wavelength of visible light is not less than 380 nanometers (nm) and not more than 700 nm. In the following description, the characteristics in the case where the wavelength of the light is 550 nm are described to simplify the description. The following description also is applicable to visible light of other wavelengths.

In the embodiment, the first substrate 10s and the second substrate 20s include glass substrates or resin substrates.

The counter electrode 21 includes a conductive material that is light-transmissive. The counter electrode 21 includes an oxide including at least one element selected from the group consisting of In, Sn, Zn, and Ti; and in the embodiment, ITO (Indium Tin Oxide) is employed as the counter electrode 21. The counter electrode 21 may include a thin metal layer that is light-transmissive.

For the members of the embodiment (first substrate 10s, the second substrate 20s, the counter electrode 21, etc.) that are light-transmissive, the transmittance is higher than the reflectance. For the members that are light-transmissive, the transmittance is higher than the absorptance.

The pixel electrodes 10e include mainly a conductive material (aluminum, etc.) that is light-reflective. Specifically, the second pixel electrode 12 and the first electrode portion 13 of the first pixel electrode 11 include conductive materials that are light-reflective. For the members that are light-reflective, the reflectance is higher than the transmittance. For the members that are light-reflective, the reflectance is higher than the absorptance.

It is favorable for the first electrode portion 13 and the second pixel electrode 12 to be specular. The polarization characteristics of the light that is incident on the first electrode portion 13 and reflected by the first electrode portion 13 are substantially not changed by the reflection. For example, in the case where the first electrode portion 13 has high diffuse reflectivity, there are cases where the polarization characteristics of the reflected light are different from the polarization characteristics of the incident light. The contrast ratio of the display may decrease in the case where the polarity degrades due to the reflection. In the case where the first electrode portion 13 and the second pixel electrode 12 are specular, it is easy to obtain a high contrast ratio. The surface of the first electrode portion 13 and the surface of the second pixel electrode 12 are relatively flat. Thereby, specular reflectivity is obtained easily.

The second electrode portion 14 of the first pixel electrode 11 includes a conductive material that is light-transmissive. The light transmittance of the second electrode portion 14 is higher than the light reflectance of the second electrode portion 14 and higher than the light absorptance of the second electrode portion 14. In the embodiment, ITO (Indium Tin Oxide) is used as the second electrode portion 14. The second electrode portion 14 may include a thin metal layer that is light-transmissive.

The second electrode portion 14 may include a conductive material that is light-absorbing. In such a case, the light absorptance of the second electrode portion 14 is higher than the light reflectance of the second electrode portion 14 and higher than the light transmittance of the second electrode portion 14.

The interconnects 16 (the first interconnect 16a and the second interconnect 16b) that are provided in the first substrate unit 10u include metal films.

The semiconductor layers that are included in the first switching element 17a and the second switching element 17b include polysilicon, amorphous silicon, or an oxide semiconductor. The oxide semiconductor includes an oxide including at least one of indium (In), gallium (Ga), or zinc (Zn).

The insulating layer 18 may include a resin material. At least one of an acrylic resin or a polyimide resin is used as the resin material. The insulating layer 18 may be light-absorbing. Thereby, the transmission of the light by the inter-pixel region 15 is suppressed. On the other hand, high patterning precision of the insulating layer 18 is obtained easily in the case where the light-transmissivity of the insulating layer 18 is high. The insulating layer 18 may include a stacked film of a resin layer and an inorganic layer.

At least one of silicon nitride, silicon oxynitride, or silicon oxide is used as the inorganic layer.

Alignment films (not shown) are further provided in the first substrate unit 10*u* and the second substrate unit 20*u*. The alignment films respectively cover the counter electrode 21 and the pixel electrodes 10*e*. The alignment films align the liquid crystal molecules of the liquid crystal layer 30. The alignment films include organic films of polyimide, etc. The alignment (the initial alignment state) of the liquid crystal layer 30 is determined by the characteristics (the anisotropy) of the alignment films. The alignment characteristics of the alignment films are obtained by performing rubbing of organic films. The alignment films may be provided with anisotropy by photo-alignment processing, etc.

The liquid crystal layer 30 is provided between the first major surface 10*a* and the second major surface 20*a*. Thereby, the liquid crystal layer 30 is disposed also between the counter electrode 21 and the multiple pixel electrodes 10*e* and between the counter electrode 21 and the inter-pixel region 15 of the first substrate unit 10*u*.

The liquid crystal layer 30 includes pixel units 30*d* (a first pixel unit 31, a second pixel unit 32, etc.). The first pixel unit 31 is disposed between the first pixel electrode 11 and the second substrate unit 20*u*. The second pixel unit 32 is disposed between the second pixel electrode 12 and the second substrate unit 20*u*. The liquid crystal layer 30 further includes a non-pixel portion 30*n*. The non-pixel portion 30*n* is disposed between the inter-pixel region 15 and the second substrate unit 20*u*.

The liquid crystal layer 30 includes a nematic liquid crystal. The liquid crystal layer 30 may include a chiral agent. A thickness tLC of the liquid crystal layer 30 is the distance along the Z-axis direction between the alignment film that covers the pixel electrodes 10*e* and the alignment film that covers the counter electrode 21.

The liquid crystal layer 30 includes a first liquid crystal portion LCa, a second liquid crystal portion LCb, and a third liquid crystal portion LCc. The second liquid crystal portion LCb is disposed between the counter electrode 21 and the first liquid crystal portion LCa. The third liquid crystal portion LCc is disposed between the first liquid crystal portion LCa and the second liquid crystal portion LCb. The first liquid crystal portion LCa is the portion of the liquid crystal layer 30 on the first substrate unit 10*u* side. The second liquid crystal portion LCb is the portion of the liquid crystal layer 30 on the second substrate unit 20*u* side. The third liquid crystal portion LCc is the central portion.

Liquid crystal molecules 35 that are included in the liquid crystal layer 30 have a director which is the alignment of a long-axis direction 35D. The alignment of the director of the liquid crystal molecules 35 changes according to the voltage applied to the liquid crystal layer 30. In other words, the liquid crystal alignment of the liquid crystal layer 30 changes according to the voltage. The effective birefringence (the retardation) of the liquid crystal layer 30 changes as the liquid crystal alignment changes. The polarization state of the transmitted light passing through the liquid crystal layer changes due to the change of the effective birefringence. Thereby, the display is performed by the transmitted light passing through the polarizing layer 52. The optical rotatory properties (the optical activity) may change according to the change of the liquid crystal alignment.

The dielectric anisotropy of the liquid crystal layer 30 may be positive or negative. To simplify the description hereinbelow, an example is described in which the dielectric anisotropy of the liquid crystal layer 30 is positive.

In the case where a voltage is not applied to the pixel electrodes 10*e* (in the initial state), the long-axis direction 35D of the liquid crystal molecules 35 of the liquid crystal layer 30 is substantially aligned with the X-Y plane. The pretilt angle (the angle between the long-axis direction 35D and the X-Y plane) of the liquid crystal molecules 35 is 10 degrees or less, e.g., about 5 degrees.

When a voltage is applied (a signal is input) to the pixel electrodes 10*e*, an electric field is generated from the pixel electrodes 10*e* toward the counter electrode 21; and the generation of the electric field causes the alignment of the director of the liquid crystal molecules 35 to twist to directions according to the position so that the intensity of the electric field balances with the anchoring forces due to the alignment films. Thereby, the tilt angle of the liquid crystal molecules becomes large. When applying the voltage, the tilt angle in the third liquid crystal portion LCc of the liquid crystal layer 30 is about 90 degrees.

When the dielectric anisotropy of the liquid crystal layer 30 is negative, the pretilt angle is not less than 70 degrees and not more than 90 degrees.

The alignment direction (the long-axis direction 35D, i.e., the liquid crystal director direction) of the liquid crystal at the first liquid crystal portion LCa is determined by the alignment processing direction (the rubbing direction) of the alignment film of the first substrate unit 10*u*. The alignment processing direction (the long-axis direction 35D, i.e., the liquid crystal director direction) of the liquid crystal at the second liquid crystal portion LCb is determined by the alignment direction (the rubbing direction) of the alignment film of the second substrate unit 20*u*.

Information relating to the alignment processing direction (the rubbing direction) of the alignment film is obtained by analyzing the alignment film using polarized light. More specifically, the information relating to the alignment processing direction of the alignment film is obtained by observing the nonuniformity (rubbing scratches, etc.) of the alignment processing. There are cases where lines based on the nonuniformity of the alignment processing are easy to observe when a voltage including direct current is applied between the counter electrode 21 and the pixel electrodes 10*e*. The alignment processing direction (and the long-axis direction 35D) can be determined based on the lines.

The alignment direction (the long-axis direction 35D) of the liquid crystal at the first liquid crystal portion LCa is determined by determining the alignment processing direction of the first substrate unit 10*u*. The alignment direction of the liquid crystal at the first liquid crystal portion LCa is aligned with the alignment processing direction of the first substrate unit 10*u*. Similarly, the alignment direction (the long-axis direction 35D) of the liquid crystal at the second liquid crystal portion LCb is determined by determining the alignment processing direction of the second substrate unit 20*u*.

Figure 2A:
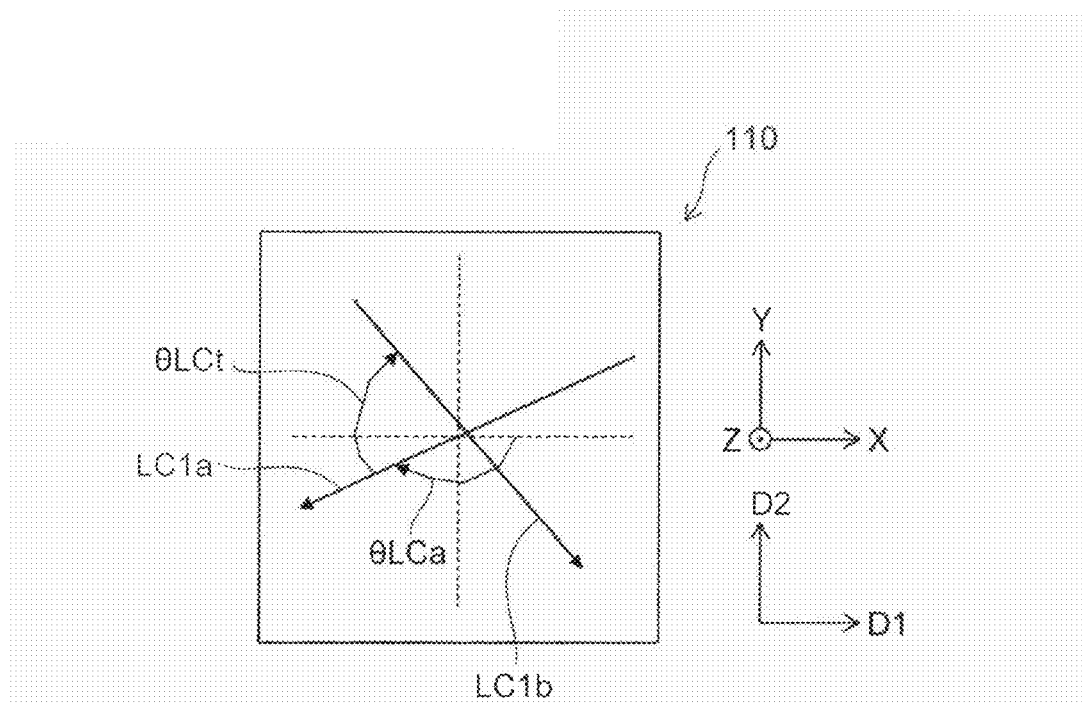
FIG. 2A and FIG. 2B are schematic views showing the liquid crystal display device according to the first embodiment.
Figure 2B:
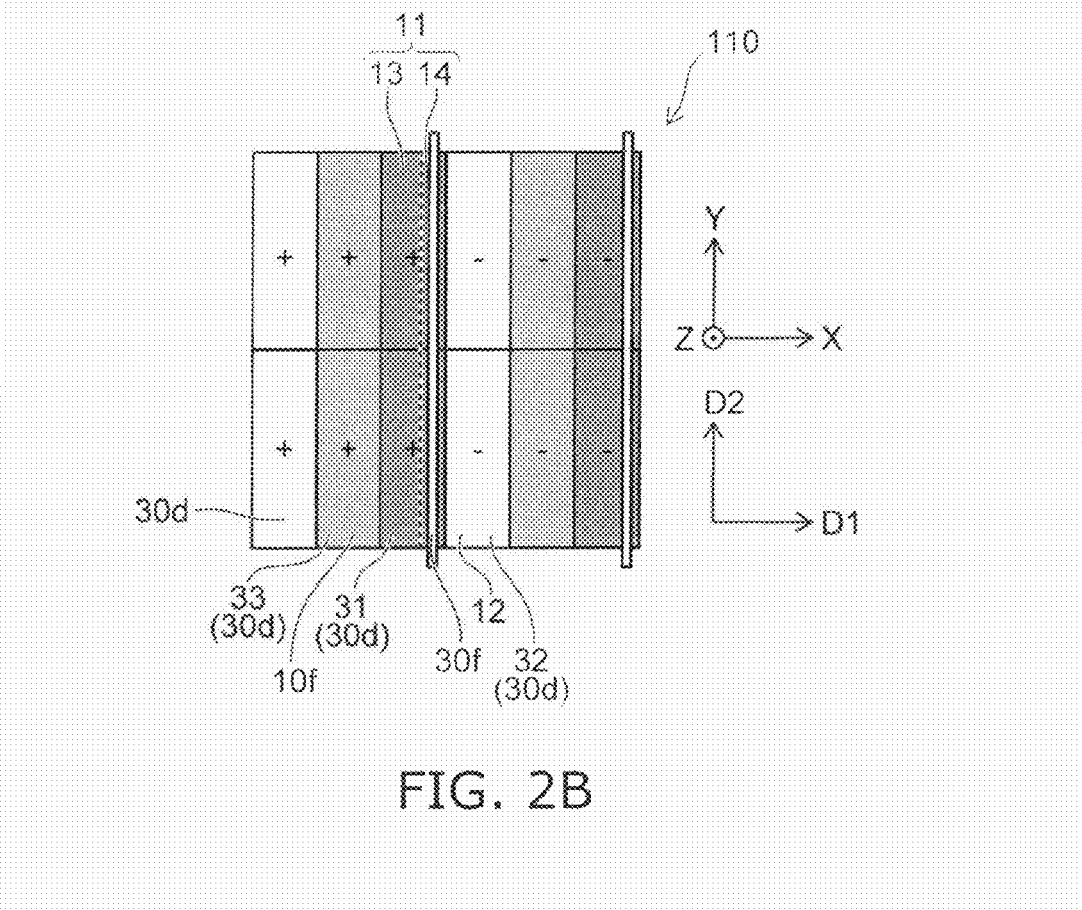

FIG. 2A and FIG. 2B are schematic views showing the liquid crystal display device according to the first embodiment.

FIG. 2A shows the alignment direction of the liquid crystal of the liquid crystal layer 30 of the liquid crystal display device 110.

A first alignment angle θLCa is the angle between the alignment direction (a first alignment direction LC1*a*) and the X-axis direction (the first direction D1) at the first liquid crystal portion LCa of the liquid crystal layer 30. The first alignment direction LC1*a* intersects a second direction D2 parallel to the first major surface 10*a* and perpendicular to the first direction D1.

The component of the first alignment direction LC1a parallel to the first direction D1 is larger than the component of the first alignment direction LC1a parallel to the second direction. The first alignment angle θLCa is a prescribed angle not less than 140 degrees and not more than 180 degrees.

A second alignment angle θLCb is the angle between the alignment direction (a second alignment direction LC1b) and the X-axis direction at the second liquid crystal portion LCb of the liquid crystal layer 30. The absolute value of the angle (a twist angle θLCt) between the first alignment direction LC1a and the second alignment direction LC1b is not less than 60 degrees and not more than 80 degrees. In the example, the twist angle θLCt is 70 degrees. The twist angle θLCt corresponds to the twist angle of the long-axis direction 35D of the liquid crystal molecules 35 inside the liquid crystal layer 30.

The retardation of the liquid crystal layer 30 when a voltage is not applied (the pretilt angle is small and is ignored) is not less than 180 nm and not more than 300 nm. In other words, the product of the thickness tLC (nm) of the liquid crystal layer 30 and the refractive index anisotropy of the liquid crystal included in the liquid crystal layer 30 is not less than 180 nm and not more than 260 nm.

FIG. 2B shows the polarities of the voltages applied to the pixel electrodes of the liquid crystal display device 110. As shown in FIG. 2B, the first pixel electrode 11 is set to a potential having a first polarity using the counter electrode 21 as a reference. In the example, the first polarity is positive. A positive voltage is applied to the first pixel electrode 11.

The second pixel electrode 12 is set to a potential having a second polarity using the counter electrode 21 as the reference. The second polarity is different from the first polarity. In the example, the second polarity is negative. A negative voltage is applied to the second pixel electrode 12.

Thus, when voltages having different polarities are applied between the first pixel electrode 11 and the second pixel electrode 12, an electric field may be generated along the lateral direction (the X-axis direction) between the first pixel electrode 11 and the second pixel electrode 12. Also, as shown in FIG. 2A, the component of the first alignment direction LC1a along the X-axis direction is larger than the component of the first alignment direction LC1a along the Y-axis direction.

Thus, when the component of the first alignment direction LC1a along the direction of the electric field generated in the liquid crystal is large, the liquid crystal molecules are affected relatively easily by the electric field in the lateral direction. Compared to other sections, disclinations occur relatively easily between the first pixel electrode 11 and the second pixel electrode 12 where these factors overlap.

More specifically, the disclinations occur easily in the liquid crystal positioned at the end portion on the second pixel electrode 12 side of the first pixel electrode 11. The relationship between the polarity of the voltage and the alignment direction of the liquid crystal is the relationship shown in FIG. 2A and FIG. 2B. In other words, alignment defects occur easily in the liquid crystal at a portion (a pixel end portion 30f) of the liquid crystal layer positioned on the second electrode portion 14.

When voltages having the same polarity are applied to adjacent pixel electrodes 10e, alignment defects do not occur easily in the liquid crystal corresponding to the region between the adjacent pixel electrodes 10e.

The multiple pixel electrodes 10e further include a pixel electrode 10f. The liquid crystal layer 30 further includes a pixel unit 33 corresponding to the pixel electrode 10f. The pixel electrode 10f is adjacent to the first pixel electrode 11. The first pixel electrode 11 is provided between the pixel electrode 10f and the second pixel electrode 12. The polarity of the voltage applied to the pixel electrode 10f is the same as the polarity of the voltage applied to the first pixel electrode. In such a case, disclinations do not occur easily in the liquid crystal corresponding to the position between the first pixel electrode 11 and the pixel electrode 10f.

In the embodiment, the second electrode portion 14 is light-transmissive. Thereby, the light that is incident on the second electrode portion 14 is not emitted to the outside from the front side of the liquid crystal display device. Thereby, an easily-viewable display is possible.

FIG. 3A and FIG. 3B are schematic plan views showing the liquid crystal display device according to the first embodiment.

FIG. 3A and FIG. 3B are schematic plan views showing the first pixel electrode 11 of the liquid crystal display device 110.

As shown in FIG. 3A, the first electrode portion 13 of the first pixel electrode 11 has a rectangular configuration having first to fourth sides 11 to 14 as viewed in plan when projected onto the X-Y plane (the first major surface 10a).

The first side I1 and the second side I2 are provided to extend parallel to each other in the second direction; and the second side I2 is separated from the first side I1. The second side I2 is provided between the first side I1 and the second pixel electrode 12.

The third side I3 connects one end of the first side I1 and one end of the second side I2. The fourth side I4 is separated from the third side I3. The fourth side I4 connects the other end of the first side I1 and the other end of the second side I2.

The second electrode portion 14 is provided along at least one side of the first electrode portion 13. The second electrode portion 14 includes a first portion 14a; and in the example shown in FIG. 3A, the second electrode portion 14 is made of the first portion 14a. When projected onto the X-Y plane, the first portion 14a has a rectangular configuration contacting the second side I2. More specifically, the first portion 14a has a rectangular configuration in which one side on the second side I2 side of the first electrode portion 13 contacts the second side I2 of the first electrode portion 13 in the region between the one end of the second side I2 and the other end of the second side I2.

In the liquid crystal display device 110, a viewer 80 views the display of the liquid crystal display device 110 from the second substrate unit 20u side. The second substrate unit 20u side from which the viewer 80 views corresponds to the front side. The first substrate unit 10u side corresponds to the backside.

The liquid crystal display device 110 according to the embodiment is a reflection-type display device.

The light (second light L2) that is incident on the liquid crystal display device 110 from the front side passes through the second substrate unit 20u and the liquid crystal layer 30 and is incident on the pixel electrode 10e (the first electrode portion 13 of the first pixel electrode 11). The second light L2 that is incident on the pixel electrode 10e is reflected by the pixel electrode 10e. The reflected second light L2 again passes through the liquid crystal layer 30 and the second substrate unit 20u and is emitted to the outside from the front side.

According to the voltage applied to the pixel electrode 10e, the liquid crystal alignment at the pixel unit 30d (the first pixel unit 31) changes; and the optical characteristics (the effective birefringence, i.e., the retardation) at the pixel unit 30d change. The brightness of the second light L2 passing through the second substrate unit 20u to be emitted to the outside changes according to the change of the optical characteristics. The brightness at the pixel unit 30d changes according to the voltage; and the display is performed.

In the state in which the voltage is not applied, the pixel unit 30d is in a dark state. In the state in which a prescribed voltage is applied, the pixel unit 30d is in a bright state. In other words, a normally dark (a normally black) configuration is applicable to the pixel unit 30d.

Light (a first light L1) that passes through the non-pixel portion 30n can pass through the first substrate unit 10u. At least a portion of the first light L1 that passes through the second substrate unit 20u, the liquid crystal layer 30 (the non-pixel portion 30n), and the inter-pixel region 15 can pass through the first substrate unit 10u. In the non-pixel portion 30n (the inter-pixel region 15), a voltage substantially is not applied to the liquid crystal layer 30. In other words, in the non-pixel portion 30n, the liquid crystal alignment is maintained to be the initial alignment.

A portion (the third light L3) of the light that passes through the second substrate unit 20u and the liquid crystal layer 30 is incident on the second electrode portion 14. In the example, the second electrode portion 14 is light-transmissive. At least a portion of the third light L3 passes through the second electrode portion 14. At least a portion of the light that passes through the second substrate unit 20u, the liquid crystal layer 30, and the second electrode portion 14 can pass through the first substrate unit 10u. Thereby, at least a portion of the third light L3 is not emitted to the outside from the front side.

In the case where the second electrode portion 14 is light-absorbing, at least a portion of the light that is incident on the second electrode portion 14 is absorbed by the second electrode portion 14. The light that is incident on the second electrode portion 14 substantially is not emitted to the outside from the front side.

The polarity of the voltage applied to the first pixel electrode 11 is different from the polarity of the voltage applied to the second pixel electrode 12. Also, the polarity of the voltage applied to the pixel electrode 10e is inverted by the driving of the display device. An electric field is generated between the first pixel electrode 11 and the second pixel electrode 12 by such voltages. There are cases where the alignment defects (the disclinations) occur in the liquid crystal of the liquid crystal layer 30 positioned between the first pixel electrode 11 and the second pixel electrode 12 due to the electric field. There are cases where the alignment defects occur in the liquid crystal of a portion (the pixel end portion 30f) of the liquid crystal layer 30 positioned on the second electrode portion 14 (between the second electrode portion 14 and the counter electrode 21). The image quality decreases when the disclinations occur. Specifically, an afterimage, blurriness, a decrease of the contrast, etc., occur due to the occurrence of the disclinations on the pixel.

In the embodiment, the second electrode portion 14 is light-transmissive. Thereby, the light that passes through the pixel end portion 30f of the liquid crystal layer 30 is not reflected and is not emitted from the front side toward the viewer 80. The viewer 80 does not perceive a decrease of the image quality even in the case where the alignment defects occur in the liquid crystal of the pixel end portion 30f of the liquid crystal layer 30. Thereby, an easily-viewable display is possible.

There is a reference example in which a light-shielding layer (a black matrix) is provided in the second substrate unit 20u. The light-shielding layer is provided to correspond to the position of the inter-pixel region 15 and the position of the end portion of the pixel electrode 10e. In other words, the light-shielding layer is provided on the portion of the liquid crystal layer 30 where the disclinations occur easily. Thereby, the light that is incident on the light-shielding layer is absorbed. The light that is affected by the disclinations is not emitted to the outside from the front side. In the reference example as well, the decrease of the image quality due to the disclinations is suppressed.

However, there is a limit to the patterning precision of the width of the light-shielding layer, etc., when forming the light-shielding layer. Also, there is a limit to the precision of the alignment between the light-shielding layer provided in the second substrate unit 20u and the pixel electrode 10e provided in the first substrate unit 10u in the manufacturing processes of the liquid crystal display device. Considering such patterning precision and alignment precision, the surface area of the light-shielding layer inside the X-Y plane undesirably becomes large. When the surface area of the light-shielding layer becomes large, the proportion of the surface area that reflects the light inside the X-Y plane becomes small. The brightness of the display of the liquid crystal display device undesirably decreases.

In the embodiment, the second electrode portion 14 that is light-transmissive is provided in the first pixel electrode 11. Because the second electrode portion 14 is transparent and there are no components to reflect the light that is incident on the layers under the second electrode portion 14, the incident light passes through as-is toward the interior of the first substrate 10s without being reflected; and thereby, the decrease of the image quality due to the disclinations is not viewed. By providing the conductive second electrode portion 14 to be continuous with the first electrode portion 13, it is unnecessary to form the light-shielding layer by considering the alignment precision, etc., as in the reference example; and it is unnecessary to reduce the surface area ratio of the reflecting region (the opening). Thereby, the brightness of the display can be maintained.

The example shown in FIG. 3B is a modification of the embodiment. As in the example, the second electrode portion 14 may contact the third side I3 when projected onto the X-Y plane. The second electrode portion 14 may contact the first side I1 or the fourth side I4.

It is desirable to provide the light-transmissive second electrode portion 14 to correspond to the location where the disclinations occur in the X-Y plane. In the example, it is desirable to provide the second electrode portion 14 along the first side I1 in the X-Y plane. It is desirable not to provide the second electrode portion 14 at a position contacting the first side I1 (or the third side I3 or fourth side I4) when projected onto the X-Y plane.

Figure 4:
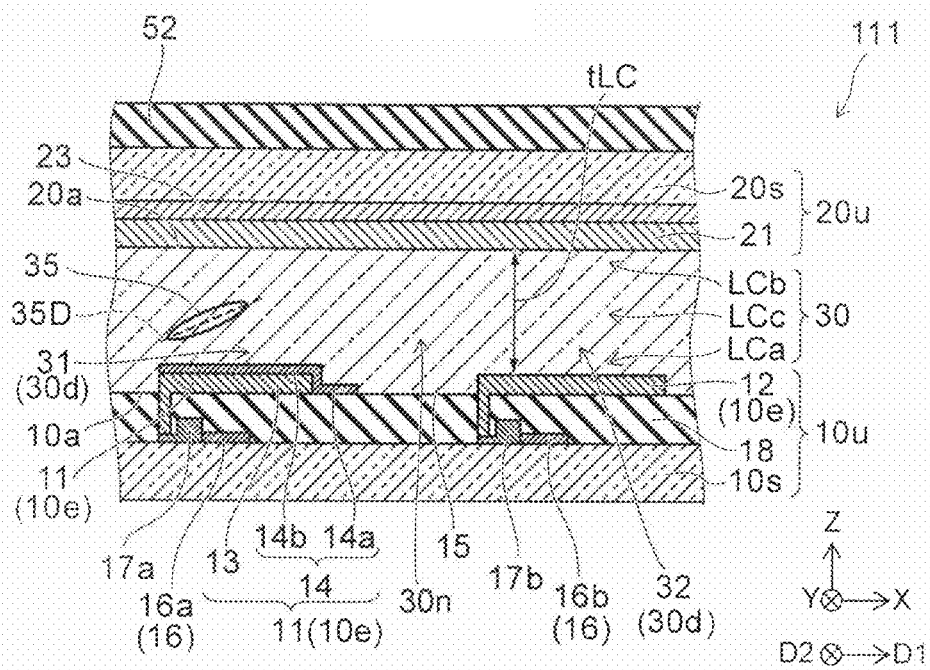
FIG. 4 is a schematic cross-sectional view showing other liquid crystal display devices according to the first embodiment.
Figure 5:
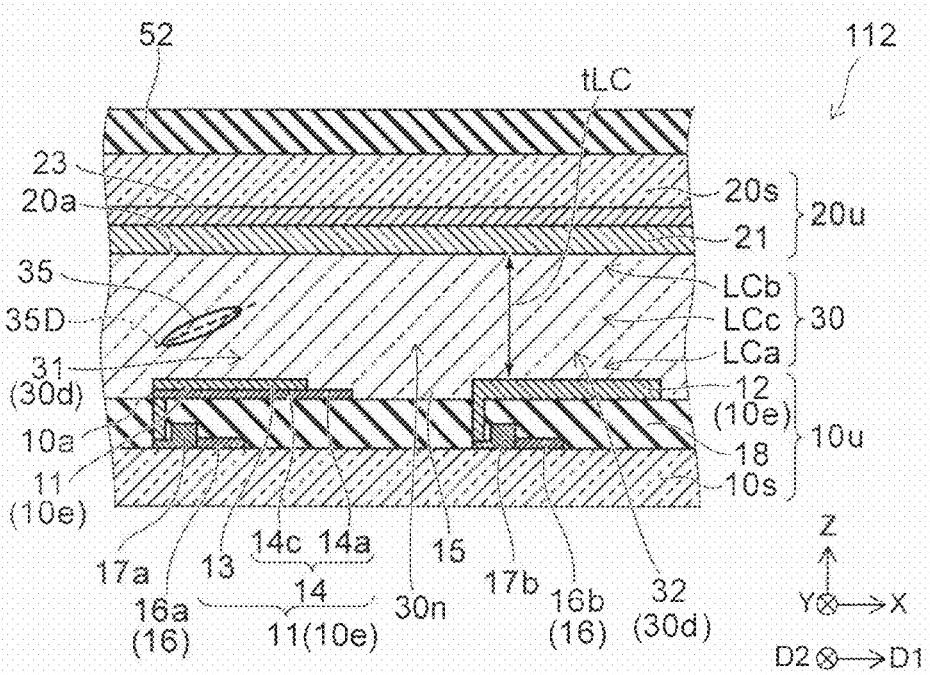
FIG. 5 is a schematic cross-sectional view showing other liquid crystal display devices according to the first embodiment.
Figure 6:
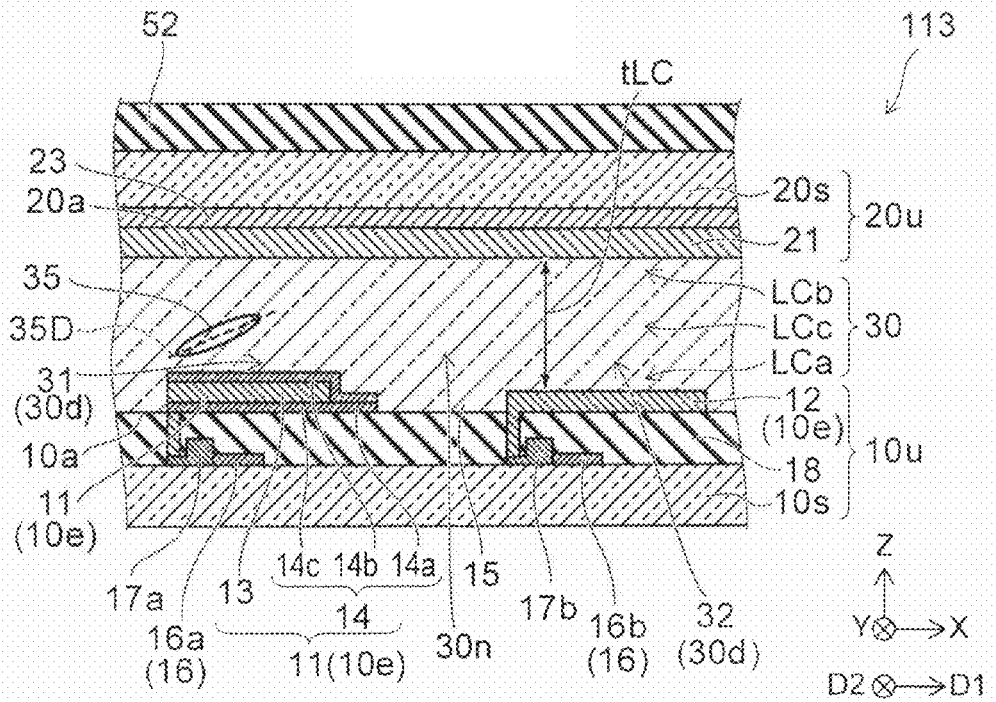
FIG. 6 is a schematic cross-sectional view showing other liquid crystal display devices according to the first embodiment.

FIG. 4, FIG. 5, and FIG. 6 are schematic cross-sectional views showing other liquid crystal display devices according to the first embodiment.

FIG. 4 shows a liquid crystal display device 111 according to the embodiment. FIG. 5 shows a liquid crystal display device 112 according to the embodiment. FIG. 6 shows a liquid crystal display device 113 according to the embodiment.

The first substrate unit 10u, the second substrate unit 20u, and the liquid crystal layer 30 are provided in the liquid crystal display devices 111 to 113 as well. Configurations similar to the configurations described in regard to the liquid crystal display device 110 are applicable to these components.

As shown in FIG. 4, the second electrode portion 14 of a liquid crystal display device 111 further includes a second portion 14b. The second portion 14b is provided between the first electrode portion 13 and the liquid crystal layer 30. In the example, the second portion 14b covers at least the first side I1 of the first electrode portion 13. The first portion 14a and the second portion 14b are provided to be continuous. The second electrode portion 14 is provided to cover the side surface of the first electrode portion 13 on the inter-pixel region 15 side.

As shown in FIG. 5, the second electrode portion 14 of a liquid crystal display device 112 further includes a third portion 14c. The third portion 14c is interposed between the first major surface 10a and the first electrode portion 13. The first electrode portion 13 is provided between the third portion 14c and the liquid crystal layer 30.

As shown in FIG. 6, the second electrode portion 14 of a liquid crystal display device 113 includes the first portion 14a, the second portion 14b, and the third portion 14c.

As shown in the liquid crystal display devices 111 to 113, various modifications of the configuration of the second electrode portion 14 are possible. It is possible to appropriately modify the configuration of the second electrode portion 14 by considering the materials included in the first electrode portion 13 or the second electrode portion 14, the process of forming the pixel electrode 10e, etc.

Second Embodiment

Figure 7:
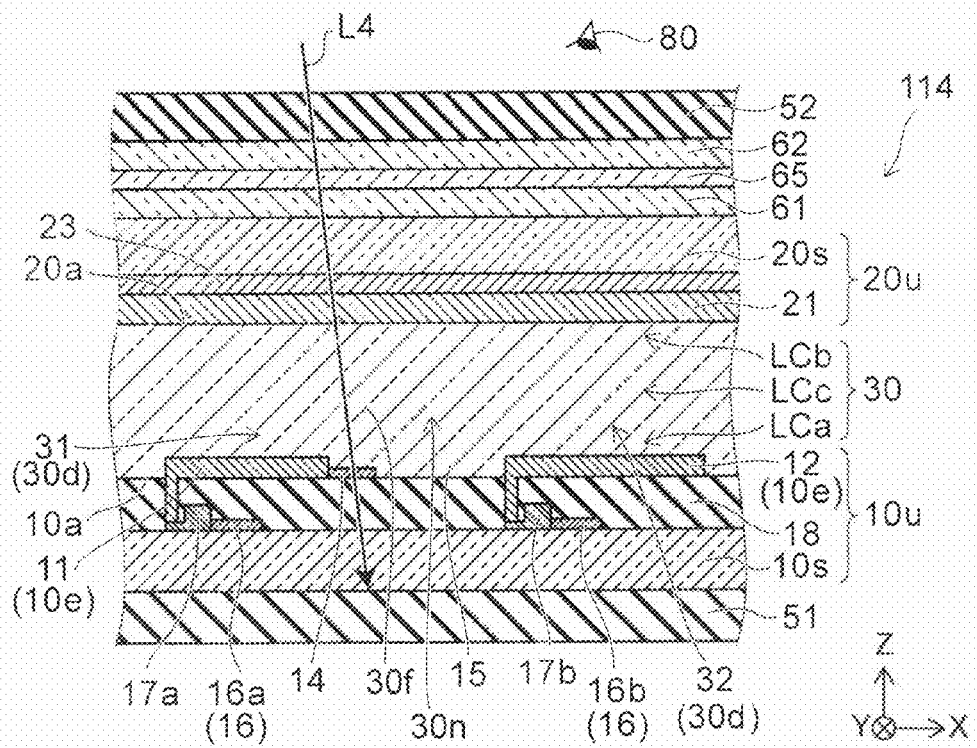
FIG. 7 is a schematic cross-sectional view showing a liquid crystal display device according to a second embodiment.

FIG. 7 is a schematic cross-sectional view showing a liquid crystal display device according to a second embodiment.

FIG. 7 shows the liquid crystal display device 114. As shown in FIG. 7, the first substrate unit 10u, the second substrate unit 20u, and the liquid crystal layer 30 are provided in the liquid crystal display device 114 as well. A configuration similar to the configuration described in regard to the liquid crystal display device 110 is applicable to the liquid crystal display device 114.

A first polarizing layer 51, the second polarizing layer 52, a first phase difference layer 61, and a second phase difference layer 62 are further provided in the liquid crystal display device 114.

The first substrate unit 10u is provided between the first polarizing layer 51 and the liquid crystal layer 30. The second substrate unit 20u is provided between the second polarizing layer 52 and the liquid crystal layer 30. At least a portion of a fourth light L4 that passes through the second polarizing layer 52, the second substrate unit 20u, the liquid crystal layer 30, and the first substrate unit 10u (the second electrode portion 14) and is incident on the first polarizing layer 51 is absorbed by the first polarizing layer 51.

The light that passes through the second electrode portion 14 and the pixel end portion 30f of the liquid crystal layer 30 and is affected by the disclinations is incident on the first polarizing layer 51 and is absorbed by the first polarizing layer 51. Thus, the light that is affected by the disclinations is not reflected and is not emitted toward the viewer 80 from the front side of the liquid crystal display device 114. Thereby, an easily-viewable display is possible.

The first polarizing layer 51 and the second polarizing layer 52 include polarizing films, polarizing plates, etc. The first polarizing layer 51 and the second polarizing layer 52 may include adhesive layers. The first polarizing layer 51 is fixed to the first substrate unit 10u by the adhesive layer. The second polarizing layer 52 is fixed to the second substrate unit 20u by the adhesive layer.

The first phase difference layer 61 is provided between the second phase difference layer 62 and the second substrate unit 20u. The second phase difference layer 62 is provided between the second polarizing layer 52 and the first phase difference layer 61.

A quarter-wave plate is used as the first phase difference layer 61. The retardation of the first phase difference layer 61 is not less than 100 nanometers and not more than 150 nanometers.

A half-wave plate is used as the second phase difference layer 62. The retardation of the second phase difference layer 62 is not less than 240 nanometers and not more than 290 nanometers.

The first phase difference layer 61 and the second phase difference layer 62 include stretched films, etc. For the phase difference layers, the product of the birefringence of the phase difference layer and the thickness of the phase difference layer corresponds to the retardation. The retardation can be determined by analysis using polarized light.

The first phase difference layer 61 substantially changes the linearly polarized light that is incident into circularly polarized light. The second phase difference layer 62 changes the polarization direction of the linearly polarized light that is incident 90 degrees.

By using these phase difference layers, the change of the optical characteristics (the effective birefringence) of the liquid crystal layer 30 is efficiently changed into a change of the brightness of the light. In other words, the brightness is increased; and a high contrast ratio is obtained. The wavelength dependence becomes small.

In the embodiment, these phase difference layers may be provided as necessary and may be omitted. By using the first phase difference layer 61, a high brightness and a high contrast ratio are obtained easily. By using the second phase difference layer 62, the wavelength dependence of the optical characteristics is improved; and the coloring is suppressed.

In the example, the liquid crystal display device 114 further includes an optical layer 65. The counter electrode 21 (the second substrate unit 20u) is provided between the liquid crystal layer 30 and the optical layer 65. The optical layer 65 is provided between the second polarizing layer 52 and the counter electrode 21.

The optical layer 65 modifies the travel direction of the light that is incident on the optical layer 65. The optical layer 65 diffuses (scatters) the light that is incident on the optical layer 65. The optical layer 65 changes the intensity of the diffuse light (the scattered light) of the light that is incident on the optical layer 65 according to the direction (the direction in the X-Y plane) of the light that is incident on the optical layer 65. Examples of the configuration and characteristics of the optical layer 65 are described below.

The polarization characteristics of the light that is incident on the optical layer 65 is substantially maintained. By using the optical layer 65, the appearance of an image of the pixel electrode 10e is suppressed even in the case where the pixel electrode 10e has relatively high specular reflectivity; and an easily-viewable display is possible.

The haze of the optical layer 65 is not less than 70% and not more than 95%. Thereby, good scattering properties are obtained; and a display having a good contrast ratio can be provided.

FIG. 8A to FIG. 8D are schematic views showing a portion of the liquid crystal display device according to the second embodiment.

Figure 8A:
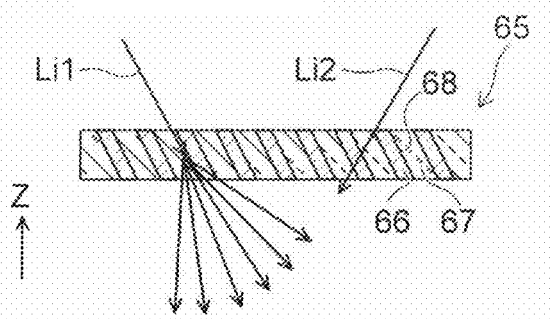
FIG. 8A to FIG. 8D are schematic views showing a portion of the liquid crystal display device according to the second embodiment.

These drawings show the optical layer 65. FIG. 8A is a schematic cross-sectional view showing the optical layer 65.

Figure 8B:
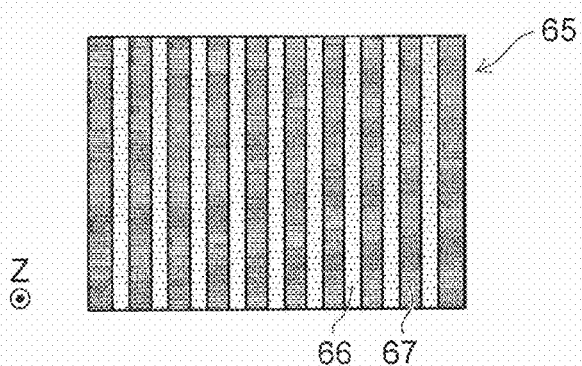
Figure 8C:
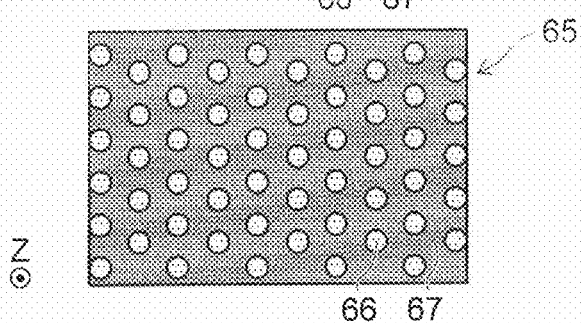
Figure 8D:
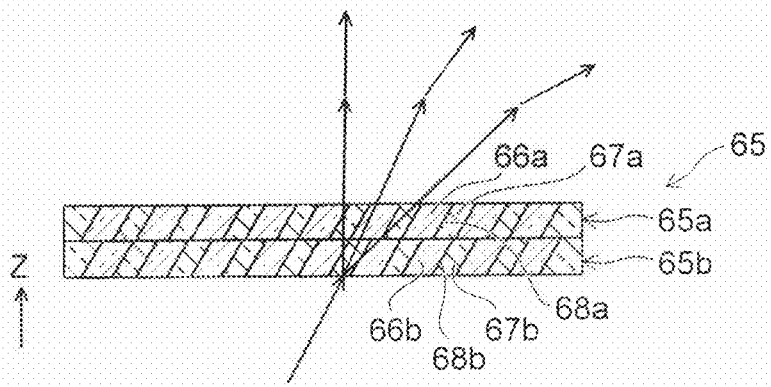

FIG. 8B is a schematic plan view showing the optical layer 65. FIG. 8C is a schematic plan view showing another example of the optical layer 65. FIG. 8D is a schematic cross-sectional view showing another example of the optical layer 65.

As shown in FIG. 8A, the optical layer 65 includes multiple first optical units 66 and a second optical unit 67. The multiple first optical units 66 are disposed in the X-Y plane (in a plane parallel to the first major surface 10a). The multiple first optical units 66 are light-transmissive. The second optical unit 67 is provided between any two of the multiple first optical units 66. The second optical unit 67 also is light-transmissive. In the example, multiple second optical units 67 are provided. The multiple first optical units 66 and the multiple second optical units 67 are disposed alternately. A boundary 68 between the second optical unit 67 and at least one of the multiple first optical units 66 is tilted with respect to the X-Y plane. The refractive index of the second optical unit 67 is higher or lower than the refractive index of the first optical unit 66.

The intensity of the scattered light of the optical layer 65 for the light (a first incident light Li1) incident on the optical layer 65 from a first incident direction is different from the intensity of the scattered light of the optical layer 65 for the light (a second incident light Li2) incident on the optical layer 65 from the second incident direction. Here, the direction of the first incident direction in the X-Y plane is different from the direction of the second incident direction in the X-Y plane.

The intensity of the scattered light of the optical layer 65 for the first incident light Li1 is higher than the intensity of the scattered light of the optical layer 65 for the second incident light Li2. The first incident light Li1 is scattered and diffused by the optical layer 65. On the other hand, for the second incident light Li2, the level of scattering (diffusion) of the optical layer 65 is low; and the transmissivity is high. Such scattering characteristics are obtained by the boundary 68 being tilted with respect to the X-Y plane. The optical layer 65 is an anisotropic scattering layer. The optical layer 65 is an anisotropic forward scattering film.

A region having a high refractive index and a region having a low refractive index are provided in the optical layer 65. The optical layer 65 is a transparent film. The level of the scattering of the optical layer 65 is different between the incident directions of the light. The optical layer 65 has a "scattering central axis." The scattering central axis corresponds to the optical axis of the first incident light Li1 shown in FIG. 8A. The scattering central axis corresponds to the incident direction of the light that scatters most.

As shown in FIG. 8B, the multiple first optical units 66 have band configurations. The first optical units 66 and the second optical units 67 extend along one direction intersecting (orthogonal to) the Z-axis direction. In the example, the optical layer 65 is a louver structure-type.

In another example shown in FIG. 8C, the multiple first optical units 66 have island configurations that are separated from each other. In the example, the optical layer 65 is a columnar structure-type.

In the example shown in FIG. 8D, the optical layer 65 includes multiple layers (a first layer 65a, a second layer 65b, etc.). These layers are stacked along the Z-axis direction. The first layer 65a includes multiple first optical units 66a that are light-transmissive and disposed in the X-Y plane, and a second optical unit 67a that is light-transmissive and provided between two of the multiple first optical units 66a. The refractive index of the second optical unit 67a is different from the refractive index of each of the multiple first optical units 66a. In such a case as well, a boundary 68a that is between the second optical unit 67a and at least one of the multiple first optical units 66a is tilted with respect to the X-Y plane.

The second layer 65b includes the multiple third optical units 66b that are light-transmissive and disposed in the X-Y plane, and a fourth optical unit 67b that is light-transmissive and provided between two of the multiple third optical units 66b. The refractive index of the fourth optical unit 67b is different from the refractive index of each of the multiple third optical units 66b. A boundary 68b that is between the fourth optical unit 67b and at least one of the multiple third optical units 66b is tilted with respect to the X-Y plane. The extension direction of the boundary 68b is aligned with the extension direction of the boundary 68a. The angle between the plane including the boundary 68b and the plane including the boundary 68a may be 30 degrees or less. The scattering area is enlarged by providing multiple layers in the optical layer 65. By providing multiple layers in the optical layer 65, the coloration (the occurrence of rainbow colors), etc., can be suppressed. The number of layers provided in the optical layer 65 may be three or more.

Figure 9A:
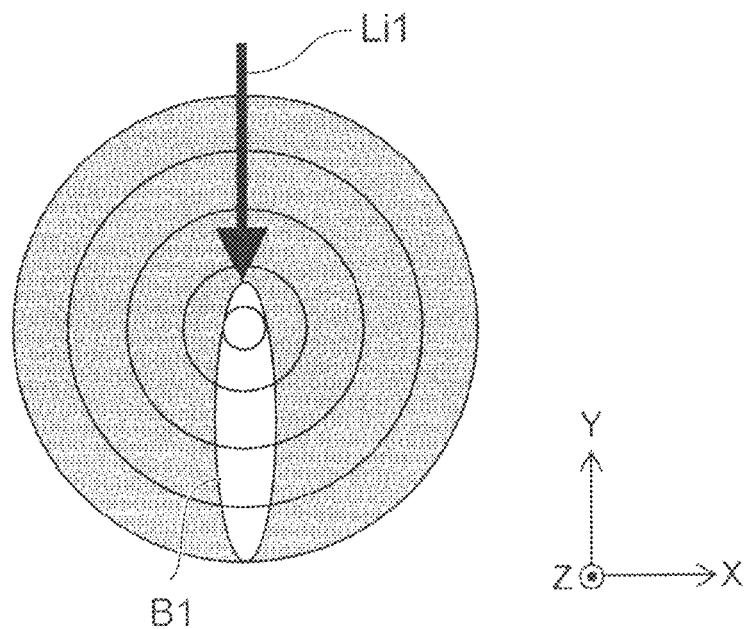
FIG. 9A and FIG. 9B are schematic plan views showing characteristics of the liquid crystal display device according to the second embodiment.
Figure 9B:
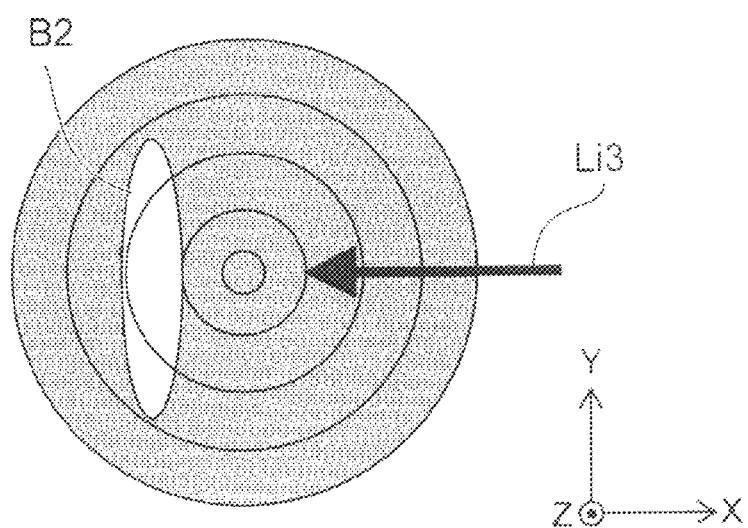

FIG. 9A and FIG. 9B are schematic plan views showing characteristics of the liquid crystal display device according to the second embodiment.

These drawings are schematic views showing characteristics of the optical layer 65 and schematically show the intensity of light passing through the optical layer 65 when the light is incident on the optical layer 65. FIG. 9A corresponds to when the first incident light Li1 is incident. In the example, the first incident light Li1 is incident on the optical layer 65 along the Y-Z plane. The incident angle of the first incident light Li1 (the angle between the Z-axis direction and the first incident light Li1) is 30 degrees. FIG. 9A corresponds to the case where the light is incident from a direction parallel to the scattering central axis. FIG. 9B corresponds to when a third incident light Li3 is incident. In the example, the third incident light Li3 is incident on the optical layer 65 along the X-Z plane. The incident angle of the third incident light Li3 (the angle between the Z-axis direction and the third incident light Li3) is 30 degrees. FIG. 9B corresponds to the case where the light is incident from a direction perpendicular to the scattering central axis.

The concentric circles shown in these drawings correspond to angles (equiangular lines) having the Z-axis direction as the reference. The center of the concentric circles corresponds to the transmitted light (the perpendicularly-emitted light) being emitted from the optical layer 65 substantially along the Z-axis direction. Bright regions B1 and B2 that are shown in these drawings are regions where the intensity of the transmitted light is high.

As shown in FIG. 9A, the intensity of the perpendicularly-emitted light is high for the first incident light Li1 along the Y-axis direction. The intensity of the transmitted light emitted in the direction tilted in the Y-Z plane also is high.

As shown in FIG. 9B, the intensity of the perpendicularly-emitted light is low for the third incident light Li3 along the X-axis direction. The intensity of the transmitted light in the direction tilted in the X-Z plane (the direction tilted from the perpendicular direction) is high.

Thus, in the optical layer 65, the intensity of the light of the optical layer 65 for the light (the first incident light Li1) incident on the optical layer 65 from the first incident direction is different from the intensity of the light of the optical layer 65 for the light (the second incident light Li2, the third incident light Li3, etc.) incident on the optical layer 65 from the second incident direction.

According to the embodiment, an easily-viewable display device can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the first substrate unit, the first pixel electrode, the second pixel electrode, the counter electrode, the second substrate unit, the first electrode portion, the second electrode portion, the liquid crystal layer, the first to third liquid crystal portion, the first alignment direction, the second alignment direction, the switching element, the first interconnect, the insulating layer, the polarizing layer, and the optical layer, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all liquid crystal display devices practicable by an appropriate design modification by one skilled in the art based on the liquid crystal display devices described above as embodiments of the invention also are within the scope of the invention to the extent that the spirit of the invention is included.

What is claimed is:

1. A liquid crystal display device, comprising:
   a first substrate unit having a first major surface, the first substrate unit including
      a first pixel electrode disposed in the first major surface, and
      a second pixel electrode disposed in the first major surface and arranged with the first pixel electrode to be adjacent to the first pixel electrode in the first direction, the second pixel electrode being light-reflective;
   a second substrate unit having a second major surface opposing the first major surface, the second substrate unit including a counter electrode provided in the second major surface, the counter electrode being light-transmissive; and
   a liquid crystal layer provided between the first major surface and the second major surface,
   the first pixel electrode including:
      a first electrode portion, the first electrode portion being light-reflective; and
      a second electrode portion, at least a portion of the second electrode portion being provided between the first electrode portion and the second pixel electrode,
   a light reflectance of the second electrode portion being lower than a light reflectance of the first electrode portion,
   the second pixel electrode being light-reflective and not having any portion that is light-transmissive,
   a light transmittance of the second electrode portion being higher than the light reflectance of the second electrode portion and higher than a light absorptance of the second electrode portion,
   wherein the second electrode portion includes a region not overlapping the first electrode portion in a direction from the first substrate unit toward the second substrate unit,
   a length of the region in the first direction is shorter than a length of the first electrode portion in the first direction and is shorter than a length of the second pixel electrode in the first direction,
   the first substrate unit includes a first switching element and a second switching element, the first switching element is electrically connected to the first pixel electrode, the second switching element is electrically connected to the second pixel electrode,
   the first pixel electrode is set to a potential having a first polarity having the counter electrode as a reference, and
   the second pixel electrode is set to a potential having a second polarity having the counter electrode as the reference, the second polarity being different from the first polarity.

2. The device according to claim 1, wherein
   the first electrode portion has, when projected onto the first major surface,
      a first side, and
      a second side separated from the first side and provided between the first side and the second pixel electrode, and
   the second electrode portion includes a first portion contacting the second side when projected onto the first major surface.

3. The device according to claim 2, wherein the second electrode portion further includes a second portion covering at least the first side of the first electrode portion.

4. The device according to claim 2, wherein the second electrode portion further includes a third portion interposed between the first major surface and the first electrode portion.

5. The device according to claim 1, wherein
   the first substrate unit further includes:
      a first substrate, the first substrate being light-transmissive;
      a first interconnect electrically connected to the first switching element, and
   at least a portion of the first interconnect is positioned between the first electrode portion and the first substrate.

6. The device according to claim 1, wherein
   the liquid crystal layer includes:
      a first liquid crystal portion;
      a second liquid crystal portion provided between the first liquid crystal portion and the second major surface; and
      a third liquid crystal portion provided between the first liquid crystal portion and the second liquid crystal portion,
   a long-axis direction of the liquid crystal of the first liquid crystal portion is a first alignment direction, and
   the first alignment direction intersects a second direction, the second direction being parallel to the first major surface and perpendicular to the first direction.

7. The device according to claim 6, wherein a component of the first alignment direction parallel to the first direction is larger than a component of the first alignment direction parallel to the second direction.

8. The device according to claim 6, wherein an angle between the first alignment direction and the first direction is not less than 140 degrees and not more than 180 degrees.

9. The device according to claim 6, wherein
a long-axis direction of the liquid crystal layer of the second liquid crystal portion is a second alignment direction, and
an angle between the first alignment direction and the second alignment direction is not less than 60 degrees and not more than 80 degrees.

10. The device according to claim 1, further comprising an optical layer,
the second substrate unit being provided between the liquid crystal layer and the optical layer,
an intensity of scattered light of the optical layer for light incident on the optical layer from a first incident direction is different from an intensity of scattered light of the optical layer for light incident on the optical layer from a second incident direction,
an alignment of a direction component of the first incident direction in a plane parallel to the first major surface is different from a direction component of the second incident direction in the plane.

11. The device according to claim 10, wherein
the optical layer includes a plurality of first optical units and a second optical unit, the first optical units being light-transmissive and disposed in the plane, the second optical unit being light-transmissive and provided between two of the first optical units, a refractive index of the second optical unit being different from a refractive index of the first optical units, and
a boundary between the first optical unit and the second optical unit is tilted with respect to the plane.

12. The device according to claim 1, wherein the first electrode portion and the second pixel electrode are specular.

* * * * *